United States Patent
Shudo (12)

(10) Patent No.: US 7,515,570 B2
(45) Date of Patent: Apr. 7, 2009

(54) CELL SHAPING DEVICE, COMMUNICATION SYSTEM HAVING THE SHAPING DEVICE AND SHAPING METHOD

(75) Inventor: Yoshio Shudo, Tokyo (JP)

(73) Assignee: NEC Corporation, Tokyo (JP)

( * ) Notice: Subject to any disclaimer, the term of this patent is extended or adjusted under 35 U.S.C. 154(b) by 511 days.

(21) Appl. No.: 10/885,104

(22) Filed: Jul. 7, 2004

(65) Prior Publication Data

US 2005/0008018 A1    Jan. 13, 2005

(30) Foreign Application Priority Data

Jul. 9, 2003    (JP) .............................. 2003-272120

(51) Int. Cl.
*H04B 7/00* (2006.01)
*H04Q 7/00* (2006.01)
*H04Q 7/20* (2006.01)

(52) U.S. Cl. ..................... 370/338; 370/310.2; 370/328

(58) Field of Classification Search .............. 370/310.1, 370/310.2, 328, 338, 350; 455/524, 525
See application file for complete search history.

(56) References Cited

U.S. PATENT DOCUMENTS

| | | | | |
|---|---|---|---|---|
| 5,790,806 | A | * | 8/1998 | Koperda ...................... 709/252 |
| 2002/0077142 | A1 | * | 6/2002 | Sato et al. .................... 455/525 |
| 2003/0048802 | A1 | * | 3/2003 | Shenoi ........................ 370/458 |
| 2003/0095543 | A1 | * | 5/2003 | Oi ............................... 370/352 |

FOREIGN PATENT DOCUMENTS

JP            2003-8634 A        1/2003

* cited by examiner

*Primary Examiner*—Alexander Eisen
*Assistant Examiner*—Michael T Thier
(74) *Attorney, Agent, or Firm*—Sughrue Mion, PLLC (57) ABSTRACT

The present invention provides a cell shaping device capable of making the appropriate shaping setting for each acquired rate of ADSL.

A database stores the link information and the shaping setting data of ATM cell that are associated with each other. Based on the link information detected by a link information detecting portion, desired shaping setting data is selected from the information recorded in the database by a selecting portion. The shaping setting data is set up in a shaping portion by a setting portion. The shaping is performed by the shaping portion.

6 Claims, 7 Drawing Sheets

| LINK INFORMATION | SHAPING SETTING DATA |
|---|---|
| 500kbps (ADSL LINK INFORMATION) | 1179 Cell/s (500,000(bit)/8(bit)/53(byte)) |
| ·····kbps | ·····Cell/s |

DATABASE CONFIGURATION DIAGRAM

| SUBSCRIBER NAME | CONTRACT | ACQUIRED RATE | RATE CHANGE | CONVENTIONAL CASE | PRESENT INVENTION |
|---|---|---|---|---|---|
| 1 | 1.5M(bps) | 1.5M | 1.0M | COMMUNICATION SPEED DEGRADES TO ABOUT 0.6M | 1.0M |
| 2 | 8M(bps) | 8M | 6M | COMMUNICATION SPEED DEGRADES TO ABOUT 4M | 6M |
| 3 | 12M(bps) | 12M | 10M | COMMUNICATION SPEED DEGRADES TO ABOUT 8M | 10M |

FIG. 7
PRIOR ART

CELL SHAPING DEVICE, COMMUNICATION SYSTEM HAVING THE SHAPING DEVICE AND SHAPING METHOD

BACKGROUND OF THE INVENTION

1. Field of the Invention

The present invention relates to a cell shaping device, a communication system having the device, and a shaping method, and more particularly to a cell shaping device for ATM (Asynchronous Transfer Mode) cell in the ADSL (Asymmetric Digital Subscriber Line), a communication system having the device, and a shaping method.

2. Description of the Prior Art

The ADSL involves a service of best effort type, and the rate that can be acquired may significantly vary each time of linking up. The service of best effort type represents the communication form in which a certain type of service (e.g., transmission band) is not guaranteed in a network. Notwithstanding the best efforts as the overall network, the service may not be guaranteed from an end-to-end viewpoint, and provided at all in the worst case. In the ADSL, as one example, the service having the down-stream maximum speed of 12 Mbps is allowed up to the speed of 12 Mbps at maximum, but may be performed at reduced speed due to effects of environment and the like, whereby the speed of 12 Mbps is not always guaranteed.

For example, in the ISDN (Integrated Services Digital Network) that has been widely introduced into Japan, the time division multiplexing is employed for the transmission system. The ADSL has a property that it is very prone to degrade by the noise produced from the ISDN due to the transmission characteristics. Therefore, the acquired rate may be enhanced or degraded under the noise condition depending on the service state of the ISDN. At present, there are various services of 12 Mbps, 8 Mbps and 1.5 Mbps in the ADSL in Japan, but the actual acquired rate greatly varies depending on the type of service, and the connection mode.

Though the ADSL equipment applied in this system has a function of converting the data format from the ATM cell to the ADSL superframe, some ATM cells maybe discarded if data is passed from the ATM cells beyond the acquired rate of the ADSL, because the ADSL layer does not have a permissible capacity for passing all the data. Since the data to be sent is divided into minute cells having a data length of 53 bytes in the ATM, if the intermediate cells are discarded, the original data may not be restored, and the discarded cells must be retransmitted. Hence, a phenomenon occurs that the acquired rate of the ADSL is high but the throughput of data is slower.

Hence, in the actual operation, it is required that the transfer interval of cell is adjusted so that the ATM cells may not be discarded or overflowed. To do this, a technique of the ATM cell shaping is used.

Figure 7:
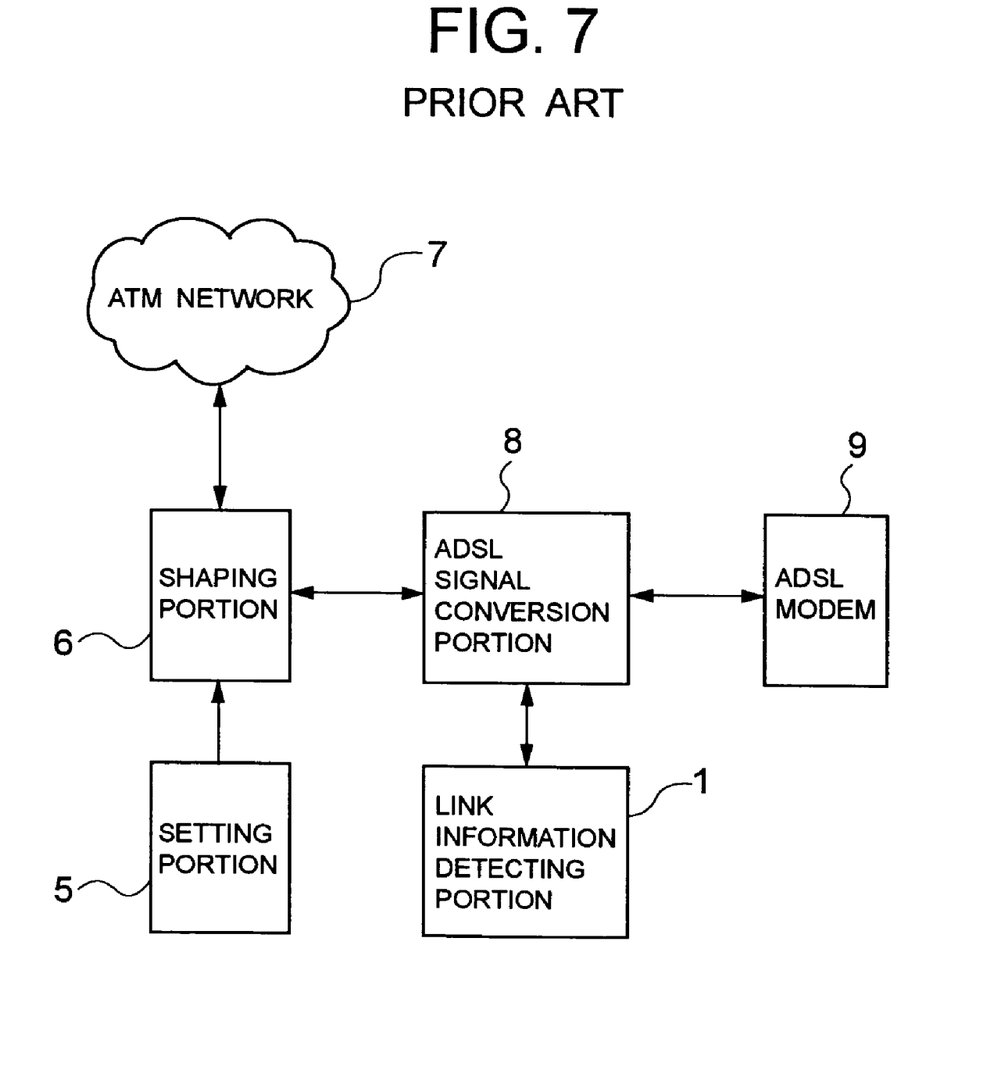
FIG. 7 is a block diagram showing one example of the conventional cell shaping device.

One example of the conventional cell shaping device employing this ATM cell shaping will be described below. FIG. 7 is a block diagram showing one example of the conventional cell shaping device. Referring to FIG. 7, the cell shaping device is composed of a shaping portion 6 making up the ATM shaping device, an ADSL signal conversion portion 8 and a link information detecting portion 1 making up the ADSL communication device, and a setting portion 5.

For the sake of convenience, FIG. 7 includes an ADSL modem 9 provided in customer and an ATM network 7. The ATM network 7 is connected to the shaping portion 6, and the ADSL model 9 is connected to the ADSL signal conversion portion 8.

The setting portion 5 sets up a predetermined shaping value in the shaping portion 6. The link information detecting portion 1 detects the ink information, namely, acquired rate information, from the ADSL signal conversion portion 8.

In the conventional ATM shaping device, the shaping setting by the setting portion 5 and the detection of the link information by the link information detecting portion 1 are performed separately, as shown in FIG. 7. Accordingly, it is common that the setting portion 5 sets up a certain shaping value in the shaping portion 6 for each ADSL service.

At this time, if the setting portion 5 sets up the shaping value below the acquired rate of ADSL in the shaping portion 6, the total band of ADSL at the acquired rate can not be employed for the data transfer, so that the throughput of actual data is slower. In the inverse case, the throughput of actual data is also slower, because the cells are discarded as previously described.

On the other hand, one technique for controlling the shaping value has been disclosed. This technique decides the shaping band, based on the flow rate measurement result of ATM cells (refer to patent document 1).

However, in the technique as described in patent document 1, the shaping band is decided based on the flow rate of cell, but can not be decided when the flow rate is zero as one example.

On the contrary, in this invention, the shaping value is decided based on the acquired rate at the time of linking up, and can be decided, irrespective of the flow rate.

Accordingly, the technique as described in patent document 1 is totally different in the constitution, operation and effects from this invention, and it is difficult to arrive at the invention from the technique as described in patent document 1.

[Patent document 1]
Japanese Patent Laid-Open No. 2003-8634 (paragraphs 0019, 0021 and FIG. 2)

BRIEF SUMMARY OF THE INVENTION

Conventionally, since the setting portion 5 sets up a definite shaping value for each service of ADSL in the shaping portion 6, it was required that the setting portion 5 sets up a new shaping value when the acquired rate was varied.

Thus, it is an object of the invention to provide a cell shaping device, a shaping method, and a communication system comprising the shaping device, in which the appropriate shaping setting can be performed at each acquired rate of ADSL.

In order to accomplish the above object, the present invention provides a cell shaping device comprising shaping control means making the shaping setting of a cell based on the link information obtained after linking up the circuit.

Also, this invention provides a communication system comprising shaping control means making the shaping setting of a cell based on the link information obtained after linking up the circuit.

Also, this invention provides a shaping method comprising a shaping control step of making the shaping setting of a cell based on the link information obtained after linking up the circuit.

That is, this invention is a system that achieves the throughput corresponding to the acquired rate of ADSL efficiently by automatically selecting and conducting the optimal ATM shaping setting based on the data rate information detected after linking up the ADSL.

Figure 1:
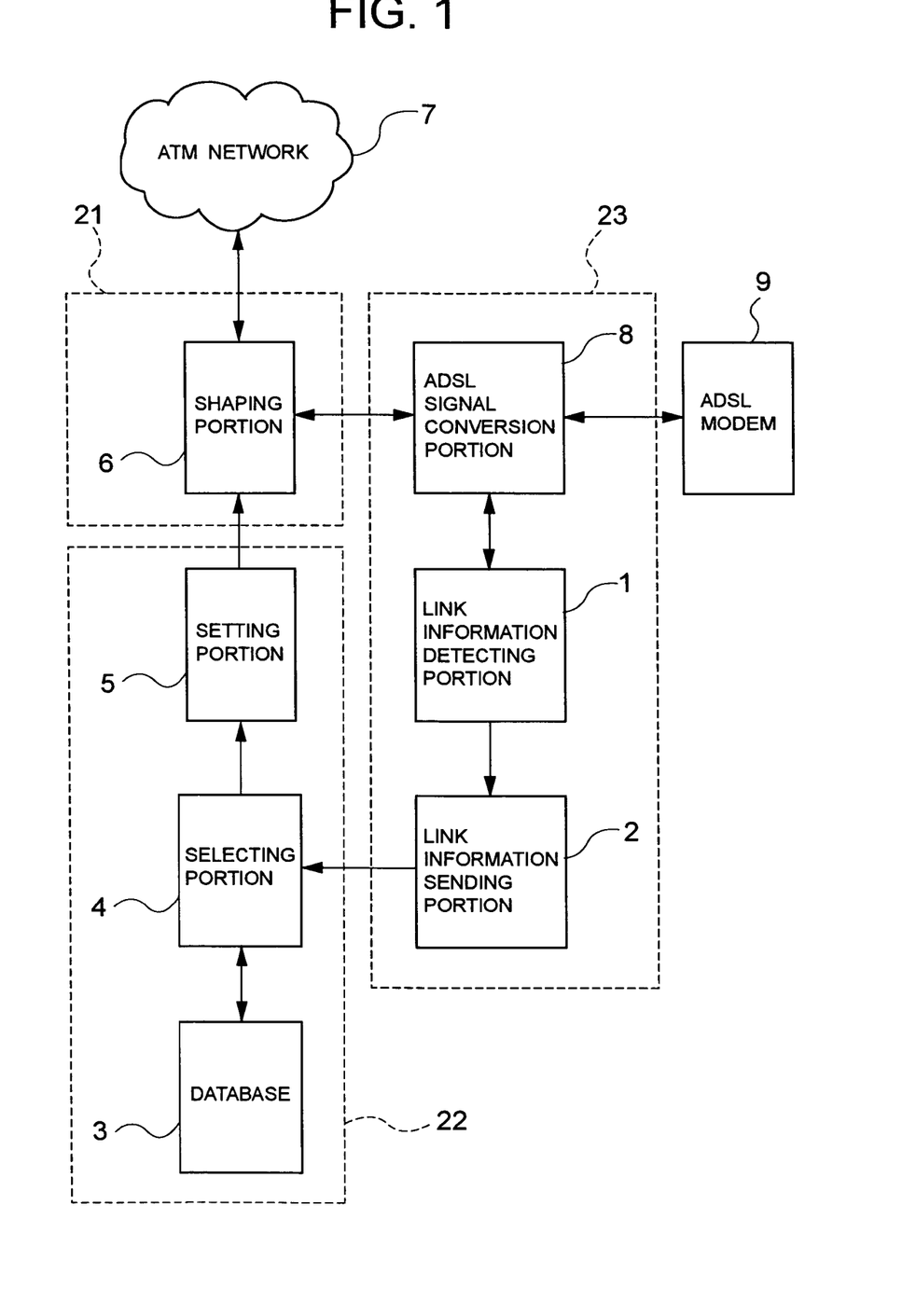
FIG. 1 is a block diagram of a communication system comprising a cell shaping device according to a first embodiment of the present invention.

In FIG. 1, the link information detected by the link information detecting portion 1 is compared with the information of the database 3 by the selecting portion 4 via the link information sending portion 2. And the optimal shaping setting is selected from the database 3 by the selecting portion 4. And the shaping portion 6 performs the setting via the setting portion 5. Whereby the high throughput is provided in the ADSL circuit.

As described above, this invention comprises shaping control means and a shaping control step of making the shaping setting of a cell based on the link information obtained after linking up the circuit, whereby the appropriate shaping setting is enabled at each acquired rate of ADSL.

More specifically, the first effect is that the high throughput is achieved without discarding the ATM cells by performing the appropriate shaping, as far as there is no error in the ADSL circuit, when the acquired rate of ADSL is changed.

The second effect is that the shaping setting is automatically performed, avoiding a mistake by manual operation. Also, it is possible to omit the complicate manual operation to adapt to the acquired rate.

The third effect is that easy means such as version up is applicable without having influence on the existent ADSL communication.

DETAILED DESCRIPTION OF THE PREFERRED EMBODIMENTS

The preferred embodiments of the present invention will be described below with reference to the accompanying drawings.

Embodiment 1

First of all, a first embodiment of the invention will be described below. FIG. 1 is a block diagram of a communication system comprising a cell shaping device according to a first embodiment of the present invention.

Referring to FIG. 1, the communication system comprises an ATM network 7, an ATM shaping device 21, an ADSL supervisory control device 22, an ADSL communication device (intra-off ice equipment) 23, and an ADSL modem (customer modem) 9. Particularly, the cell shaping device is composed of the ATM shaping device 21, the ADSL supervisory control device 22, and the ADSL communication device 23.

The ATM shaping device 21 is connected to the ATM network 7 and the ADSL supervisory control device 22. The ADSL communication device (intra-office equipment) 23 is connected to the ATM shaping device 21 and the ADSL supervisory control device 22. And the ADSL modem 9 is connected to the ADSL communication device (intra-office equipment) 23.

The ATM shaping device 21 comprises a shaping portion 6, which performs the shaping based on the shaping setting data set up by the setting portion 5.

The ADSL supervisory control device 22 comprises a database 3, a selecting portion 4 and the setting portion 5. The database 3 stores the ADSL link information and the shaping setting data of ATM cell that are associated with each other. The selecting portion 4 selects the desired shaping setting data from the database 3, based on the link information sent from a link information sending portion 2. The setting portion 5 sets up the shaping setting data selected by the selecting portion 4 in the shaping portion 6.

The ADSL communication device 23 comprises a link information detecting portion 1, a link information sending portion 2, and an ADSL signal conversion portion 8.

The ADSL signal conversion portion 8 converts the data format from the ATM cell to the superframe of ADSL.

The link information detecting portion 1 detects the acquired rate that is the ADSL linkup information (link information) from the ADSL signal conversion portion 8.

The link information sending portion 2 sends the link information detected by the link information detecting portion 1 to the selecting portion 4.

Figure 2:
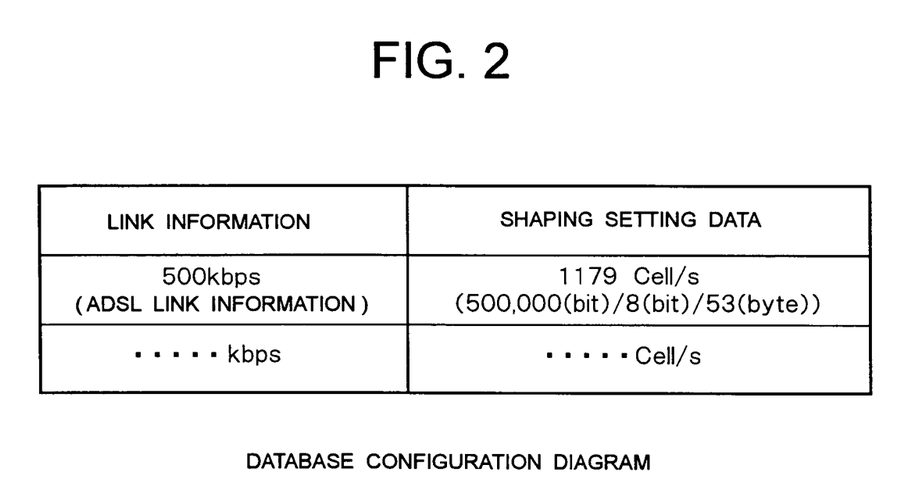
FIG. 2 is a diagram showing the configuration of a database 3.

The configuration of the database 3 will be now described. FIG. 2 is a diagram showing the configuration of the database 3. In FIG. 2, the link information (unit: bps) means the acquired rate information in linking up, especially the ADSL link speed, and the shaping setting data means the number of sendable cells per unit time (unit: Cell/s). The database 3 stores one or more pairs of the link information and the shaping setting data that are associated with each other.

The shaping setting data can be uniquely calculated from the link information. As one example, when the link information is 500 kbps, the shaping setting data S is represented by $S=500,000(\text{bit})/8(\text{bit})/53(\text{byte})$ The unit of S is Cell/s.

By making this calculation, the shaping setting data S is given as 1179 Cell/s, when the link information is 500 kbps. This example is shown in FIG. 2.

Accordingly, it is possible to calculate the shaping setting data S corresponding to any link information, and store a plurality of shaping setting data in the database 3.

Figure 3:
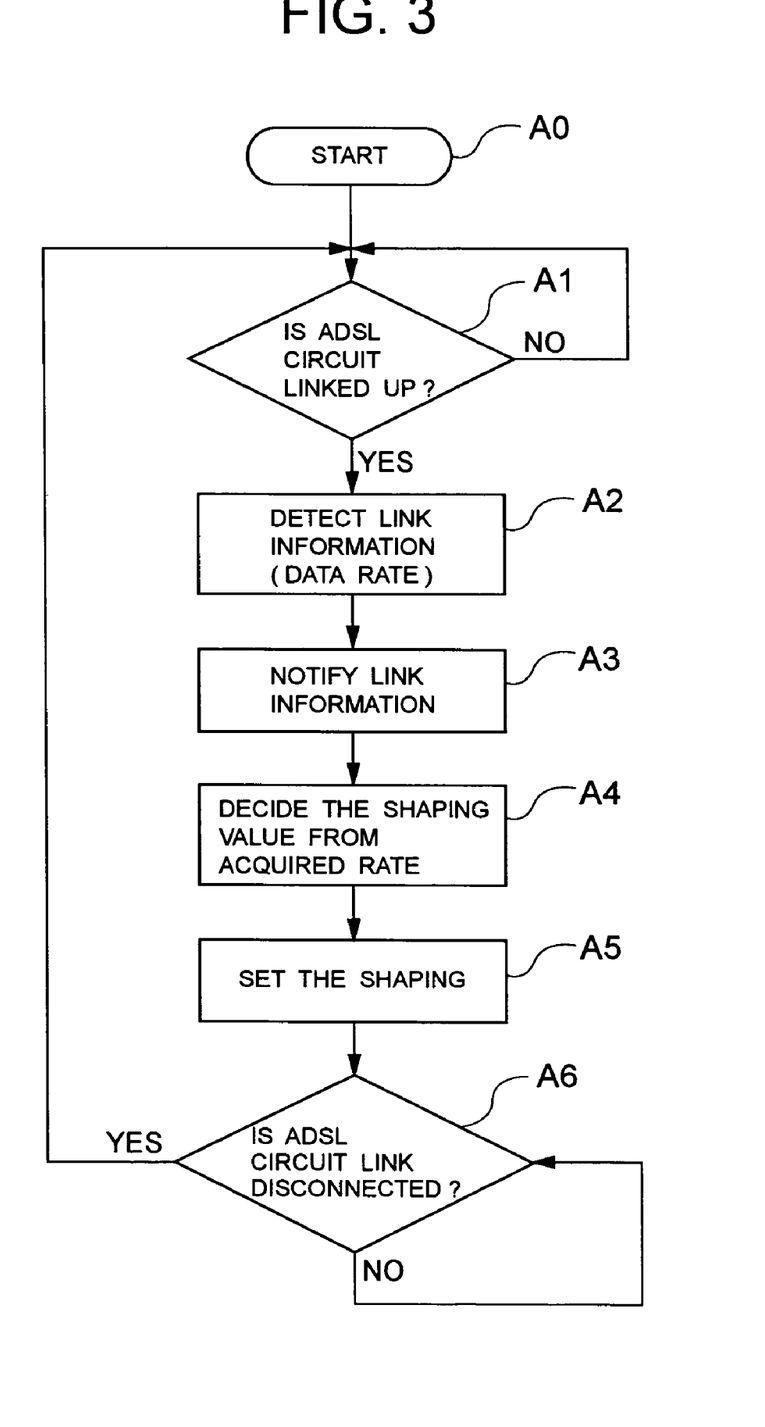
FIG. 3 is a flowchart showing the operation of the cell shaping device according to the first embodiment of the invention.

Referring to FIGS. 1 and 3, the operation of the cell shaping device according to this invention will be described below. FIG. 3 is a flowchart showing the operation of the cell shaping device according to the first embodiment of the invention.

If the ADSL modem 9 is connected, the ADSL circuit attempts to link up. The linkup of ADSL as used herein means establishment of a communication negotiation between the ADSL communication device 23 and the ADSL modem 9, or a state in which the frequency band used for the data communication in ADSL is kept, and the ADSL service is normally conducted.

The link information detecting portion 1 detects the state of the ADSL circuit. When the linkup is not established, the ADSL communication is not enabled, whereby the automatic ATM cell shaping with this system is not performed (NO at step A1).

When the linkup is established (YES at step A1), the linkup information detecting portion 1 further detects the acquired rate information of the ADSL (step A2).

The detected link information is notified to the selecting portion 4 by the link information sending portion 2 (step A3).

The selecting portion 4 selects the shaping setting data of ATM cell optimal for the ADSL circuit from the link information notified by the link information sending portion 2 and the setting data for shaping the ATM cell that is prestored for each acquired rate in the database 3 (step A4).

The selected shaping setting data is set in the shaping portion 6 performing the shaping of the ATM cell by the setting portion 5 (step A5).

If the link of ADSL is not disconnected (NO at step S6), the present shaping setting is kept, or if it is disconnected (YES at step A6), the procedure returns to step A1.

The shaping of ATM cell is performed by the shaping portion 6 as described above, so that the optimal throughput is realized in the communications from the ATM network 7 to the ADSL modem 9.

Embodiment 2

Figure 4:
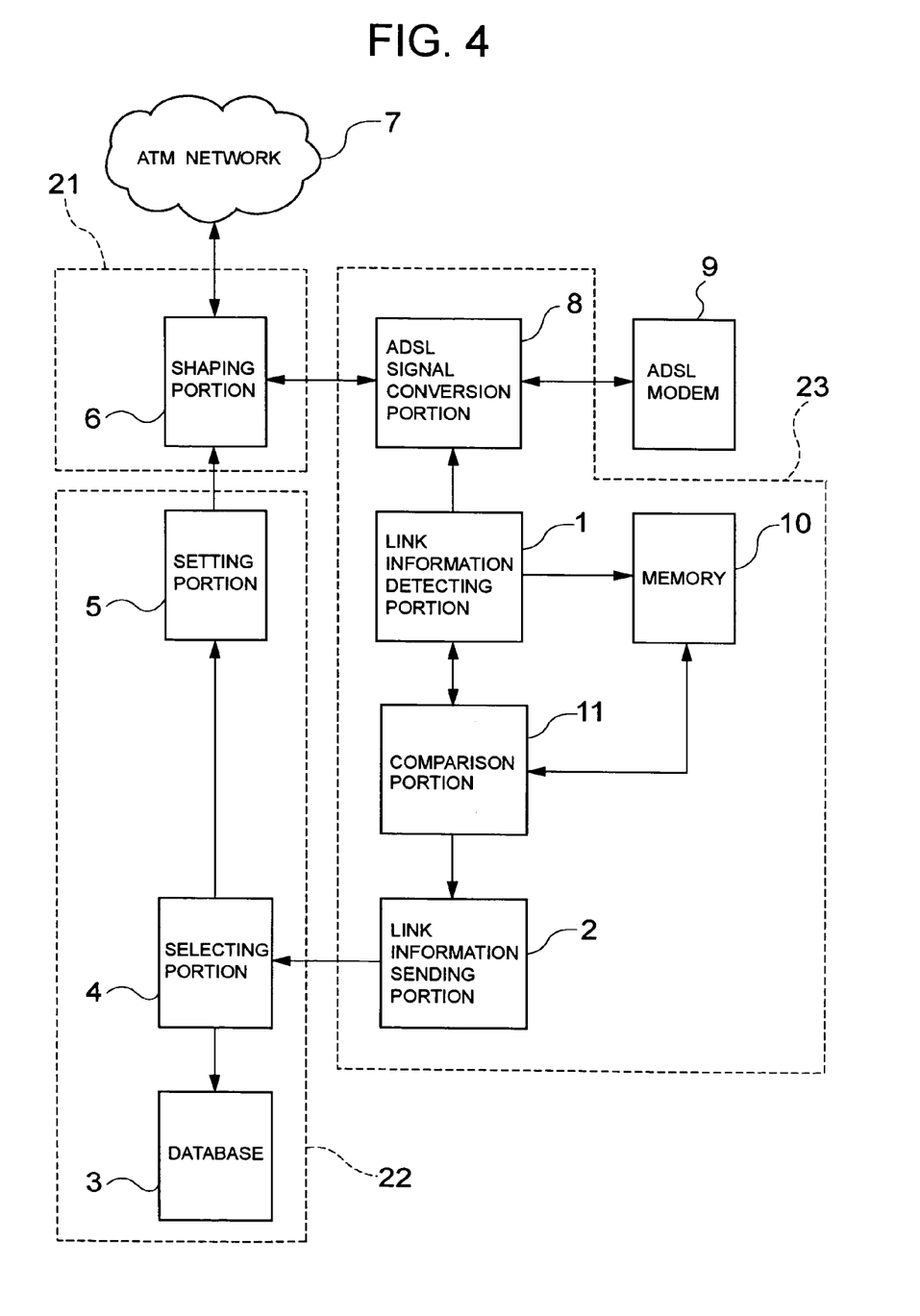
FIG. 4 is a block diagram of a communication system according to a second embodiment of the invention.

A second embodiment of the invention will be described below. FIG. 4 is a block diagram of a communication system according to the second embodiment of the invention. In FIG. 4 the same or the like parts as in FIG. 1 are designated by the same numerals throughout the drawings, and not described here.

In the system of FIG. 1, the ATM cell shaping setting is automatically performed every time of linking up the ADSL, resulting in a problem that in linking up at the same acquired rate, the same setting is made again.

Figure 5:
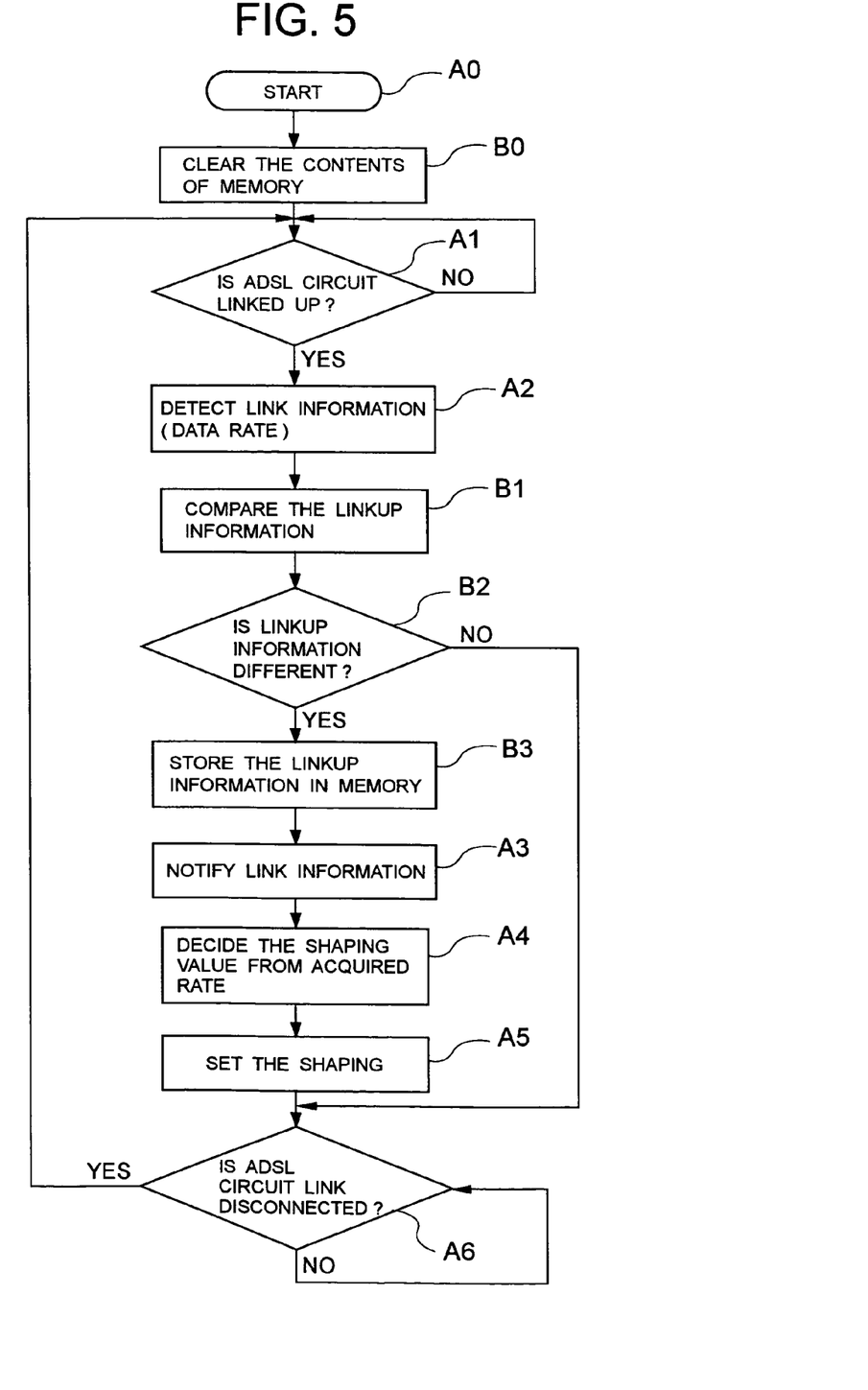
FIG. 5 is a flowchart showing the operation of the cell shaping device according to the second embodiment of the invention.

To avoid this problem, a memory 10 and a comparison portion 11 are added to the ADSL communication device 23 as shown in FIG. 4. Referring to FIG. 5, the configuration and operation will be described. FIG. 5 is a flowchart showing the operation of the cell shaping device according to the second embodiment of the invention.

To begin with, the contents of the memory 10 are initialized at the time of starting this system (step B0).

If the ADSL modem 9 is connected, the ADSL circuit attempts to link up (step A1). The link information detecting portion 1 detects the state of the ADSL circuit, and if the linkup is not established the ADSL communication is not enabled, and the automatic ATM cell shaping with this system is not performed (NO at step A1).

When the linkup is established (YES at step A1), the link information detecting portion 1 detects the acquired rate information of the ADSL circuit (step A2).

The memory 10 has a function of storing the link information at the previous time of linkup (hereinafter referred as the linkup information), and is connected to the link information detecting portion 1 and the comparison portion 11. The comparison portion 11 has a function of comparing the previous linkup information stored in the memory 10 and the present linkup information, and compares the linkup information (step B1).

If both the linkup information are not equivalent as a result of comparison (YES at step B2), the present linkup state is held in the memory (step B3), and the link information is passed to the link information sending portion 2. Thereby, the automatic shaping setting is implemented by performing the operation at step A3 to step A5 as described in the first embodiment.

Also, when the linkup is performed for the first time, the comparison result of the linkup information at step B2 is necessarily "different" (YES at step B2), because the contents of the memory are cleared at step B0, whereby the automatic shaping is normally performed (steps B3, A3 to A5).

If the linkup information is the same as a result of comparison in the comparison portion 11 (NO at step B2), the procedure jumps to step A6, whereby the shaping setting is not performed to avoid the duplicate setting.

The set shaping is performed if the link of the ASDL circuit is not disconnected at step A6 (NO at step A6). If the link of the ADSL is disconnected (YES at step A6), the procedure returns to step A1. In the following, the previous processing is repeated.

Embodiment 3

A third embodiment of the invention will be described below. In the first embodiment, the ATM shaping device 21 comprises the shaping portion 6, the ADSL supervisory control device 22 comprises the database 3, the selecting portion 4 and the setting portion 5, and the ADSL communication device 23 comprises the link information detecting portion 1, the link information sending portion 2, and the ADSL signal conversion portion 8 (see FIG. 1). However, this invention is not limited to such a configuration.

Modified embodiment 1: The ATM shaping device 21 and the ADSL supervisory control device 22 may be included within the ADSL communication device 23. That is, the ADSL communication device 23 may comprise the shaping portion 6, the database 3, the selecting portion 4, the setting portion 5, the link information detecting portion 1, the link information sending portion 2, and the ADSL signal conversion portion 8. The contents of the shaping setting process are the same as described in the first embodiment, and not described here.

Modified embodiment 2: The ATM shaping device 21 may be included within the ADSL communication device 23. That is, the ADSL communication device 23 may comprise the shaping portion 6, the link information detecting portion 1, the link information sending portion 2, and the ADSL signal conversion portion 8. The configuration of the ADSL supervisory control device 22 is the same as in the first embodiment. The contents of the shaping setting process are the same as described in the first embodiment, and not described here.

Modified embodiment 3: The ATM shaping device 21 and the ADSL communication device 23 may be included within the ADSL supervisory control device 22. That is, the ADSL supervisory control device 22 may comprise the shaping portion 6, the database 3, the selecting portion 4, the setting portion 5, the link information detecting portion 1, the link information sending portion 2, and the ADSL signal conversion portion 8. The contents of the shaping setting process are the same as described in the first embodiment, and not described here.

The modified embodiments of the third embodiment may be applicable to the second embodiment as shown in FIG. 4.

Figure 6:
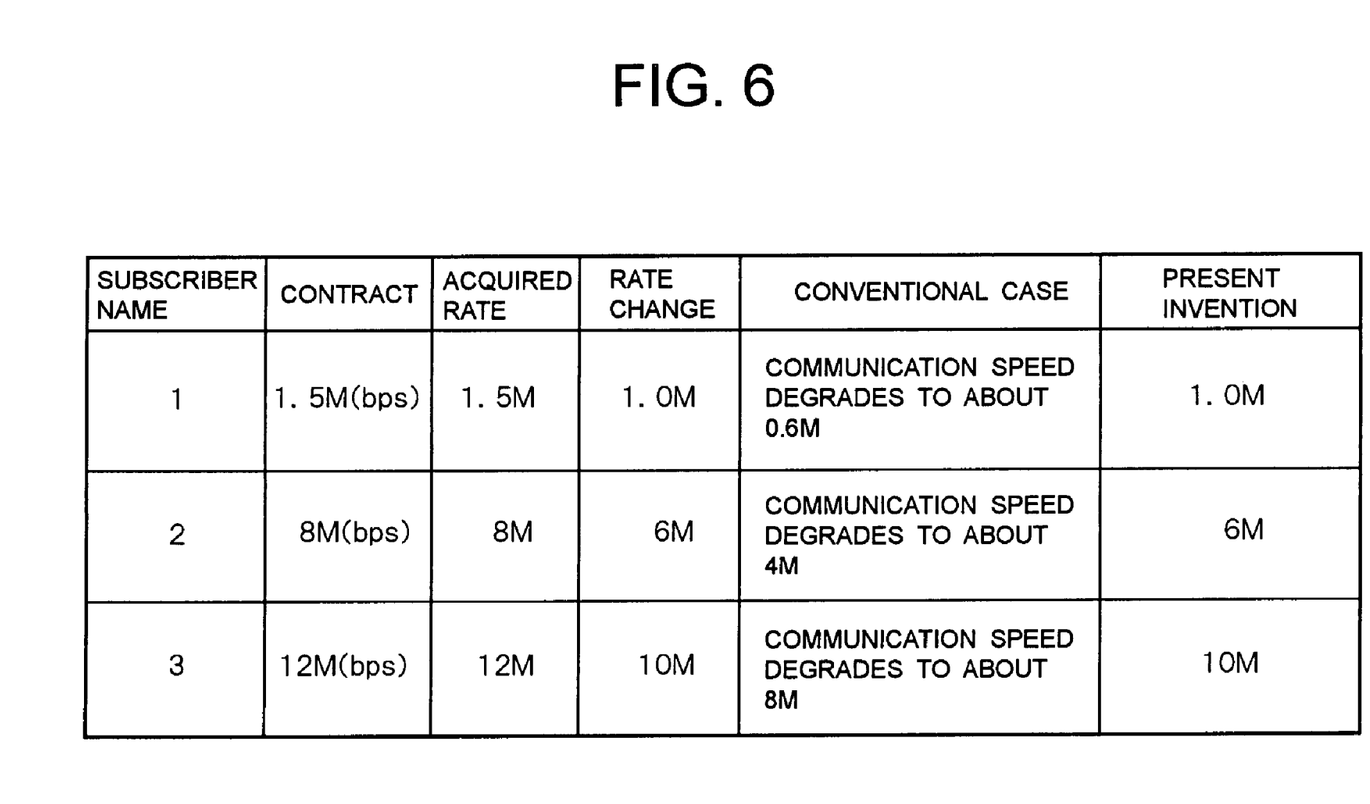
FIG. 6 is a diagram listing the different points in the effect between the invention and the conventional example.

FIG. 6 is a diagram listing the different points in the effect between the invention and the conventional example. In FIG. 6, three subscribers with names 1, 2, 3 exist as one example. Subscriber 1 has a contract of 1.5 Mbps. It is supposed that the acquired rate is 1.5 Mbps.

Herein, it is supposed that the rate is degraded to 1.0 Mbps due to the noise produced from the ISDN. At this time, since data of 1.5 Mbps is passed into the circuit in which 1.0 Mbps is permissible, the packets are discarded, so that the throughput is lower as a whole and the communication speed is degraded to about 0.6 Mbps in the conventional example.

On the contrary, according to this invention, even when the rate is degraded to 1.0 Mbps, the resetting of the cell shaping is automatically performed, whereby the rate of 1.0 Mbps is held.

Likewise, in the case of subscriber 2 (contract: 8 Mbps), the communication speed is degraded to about 4 Mbps in the conventional example, and in the case of subscriber 3 (contract: 12 Mbps), the communication speed is degraded to about 8 Mbps in the conventional example. However, in this invention, this degradation is not caused, and the rates of 6 Mbps and 10 Mbps are held respectively.

In the first to third embodiments, the ATM cell is transferred from the ATM network 7 via the shaping portion 6 and the ADSL signal conversion portion 8 in the direction (down direction) toward the ADSL modem 9. However, the invention is not limited to those embodiments, but may be similarly applied to the shaping setting process in which the ATM cell is transferred from the ADSL modem 9 via the ADSL signal conversion portion 8 and the shaping portion 6 in the direction (up direction) toward the ATM network 7.

Also, the invention may be applied to the shaping setting process for other cells than the ATM cell.

What is claimed is:

1. A cell shaping device comprising shaping control means controlling the shaping setting of a cell based on the link information obtained at the time of linking up the circuit,
    wherein said shaping control means comprises a link information detecting portion for detecting said link information at the time of linking up the circuit, and a setting portion for setting the shaping setting data based on the link information detected by said link information detecting portion, and
    wherein said shaping control means stores said link information and said shaping setting data that are associated with each other,
    wherein said shaping control means comprises a database for storing said link information and said shaping setting data that are associated with each other, and a selecting portion for selecting the shaping setting data corresponding to the link information detected by said link information detecting portion from said database, in which said setting portion sets up the shaping setting data selected by said selecting portion.

2. A cell shaping device comprising shaping control means controlling the shaping setting of a cell based on the link information obtained at the time of linking up the circuit,
    wherein said shaping control means comprises a link information detecting portion for detecting said link information at the time of linking up the circuit, and a setting portion for setting the shaping setting data based on the link information detected by said link information detecting portion, and
    wherein said shaping control means stores said link information and said shaping setting data that are associated with each other,
    wherein said shaping control means comprises a memory for storing the link information in linking up at the previous time, and a comparison portion for comparing the present link information detected by said link information detecting portion and the link information stored in said memory in linking up at the previous time, in which the setting of said shaping setting data is not performed when a comparison result in said comparison portion is identical.

3. A communication system comprising shaping control means controlling the shaping setting of a cell based on the link information obtained at the time of linking up the circuit,
    wherein said shaping control means comprises a link information detecting portion for detecting said link information at the time of linking up the circuit, and a setting portion for setting the shaping setting data based on the link information detected by said link information detecting portion, and
    wherein said shaping control means stores said link information and said shaping setting data that are associated with each other,
    wherein said shaping control means comprises a database for storing said link information and said shaping setting data that are associated with each other, and a selecting portion for selecting the shaping setting data corresponding to the link information detected by said link information detecting portion from said database.

4. A communication system comprising shaping control means controlling the shaping setting of a cell based on the link information obtained at the time of linking up the circuit,
    wherein said shaping control means comprises a link information detecting portion for detecting said link information at the time of linking up the circuit, and a setting portion for setting the shaping setting data based on the link information detected by said link information detecting portion, and
    wherein said shaping control means stores said link information and said shaping setting data that are associated with each other,
    wherein said shaping control means comprises a memory for storing the link information in linking up at the previous time, and a comparison portion for comparing the present link information detected by said link information detecting portion and the link information stored in said memory in linking up at the previous time, in which the setting of said shaping setting data is not performed when a comparison result in said comparison portion is identical.

5. A shaping method comprising a shaping control step of controlling the shaping setting of a cell based on the link information obtained at the time of linking up the circuit,
    wherein said shaping control step comprises a link information detecting step of detecting said link information at the time of linking up the circuit, and a setting step of setting the shaping setting data based on the link information detected at said link information detecting step, and
    wherein said shaping control step stores said link information and said shaping setting data that are associated with each other,
    wherein said shaping control step comprises a database for storing said link information and said shaping setting data that are associated with each other, and a selecting step of selecting the shaping setting data corresponding to the link information detected at said link information detecting step from said database, in which said setting step comprises setting up the shaping setting data selected at said selecting step.

6. A shaping method comprising a shaping control step of controlling the shaping setting of a cell based on the link information obtained at the time of linking up the circuit,
    wherein said shaping control step comprises a link information detecting step of detecting said link information at the time of linking up the circuit, and a setting step of setting the shaping setting data based on the link information detected at said link information detecting step, and
    wherein said shaping control step stores said link information and said shaping setting data that are associated with each other, wherein said shaping control step comprises a memory for storing the link information in linking up at the previous time, and a comparison step of comparing the present link information detected by said link information detecting portion and the link information stored in said memory in linking up at the previous time, in which the setting of said shaping setting data is not performed when a comparison result at said comparison step is identical.

* * * * *